(12) United States Patent
Kawashima et al.

(10) Patent No.: US 7,557,172 B2
(45) Date of Patent: Jul. 7, 2009

(54) ETHYLENE-ALPHA-OLEFIN COPOLYMER

(75) Inventors: Yasutoyo Kawashima, Ichihara (JP);
Yuki Iseki, Chiba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 11/386,942

(22) Filed: Mar. 23, 2006

(65) Prior Publication Data

US 2006/0217510 A1   Sep. 28, 2006

(30) Foreign Application Priority Data

Mar. 28, 2005   (JP) .............................. 2005-091267

(51) Int. Cl.
*C08F 210/02* (2006.01)
*C08F 210/16* (2006.01)
*C08F 210/14* (2006.01)

(52) U.S. Cl. ................. 526/348.5; 526/348; 526/352.2; 526/352; 528/396

(58) Field of Classification Search ................. 526/160, 526/348, 348.5, 352.2; 520/396; 528/396
See application file for complete search history.

(56) References Cited

U.S. PATENT DOCUMENTS

| | | | |
|---|---|---|---|
| 6,562,905 B1 * | 5/2003 | Nummila-Pakarinen et al. | 525/191 |
| 6,867,277 B2 * | 3/2005 | Iseki | 526/348.3 |
| 7,125,946 B2 * | 10/2006 | Iseki et al. | 526/348.6 |
| 7,141,639 B2 * | 11/2006 | Iseki et al. | 526/352 |
| 7,335,715 B2 * | 2/2008 | Iseki et al. | 526/348 |
| 7,339,019 B2 * | 3/2008 | Iseki et al. | 526/348 |
| 2003/0069127 A1 * | 4/2003 | Takaoki et al. | 502/108 |

FOREIGN PATENT DOCUMENTS

| | | | |
|---|---|---|---|
| JP | 63-202640 | * | 8/1988 |
| JP | 8-231781 | * | 9/1996 |

* cited by examiner

*Primary Examiner*—Ling-Siu Choi
*Assistant Examiner*—Rip A. Lee
(74) *Attorney, Agent, or Firm*—Fitch, Even, Tabin & Flannery

(57) ABSTRACT

An ethylene-α-olefin copolymer comprising a repeating unit derived from ethylene and a repeating unit derived from an α-olefin having 3 to 20 carbon atoms, wherein a melt flow rate (MFR) is 0.01 to 100 g/10 minutes, a density is 860 to 970 kg/m$^3$, a molecular weight distribution (Mw/Mn) is 2 to 8, and a ratio ($\eta^*_{0.1}/\eta^*_{100}$) of a dynamic complex viscosity ($\eta^*_{0.1}$) at a temperature of 190° C. and an angular frequency of 0.1 rad/s, to a dynamic complex viscosity ($\eta^*_{100}$) at a temperature of 190° C. and an angular frequency of 100 rad/s is 15 to 100 is excellent in balance between mechanical strength and processability.

5 Claims, No Drawings

ETHYLENE-ALPHA-OLEFIN COPOLYMER

This Application is a U.S. Utility Patent Application which claims priority from Japanese Application No. JP 2005-091267, filed Mar. 28, 2005, the complete disclosures of which are incorporated herein by reference.

BACKGROUND OF THE INVENTION

1. Field of the Invention

The present invention relates to an ethylene-α-olefin copolymer. More particularly, the present invention relates to an ethylene-α-olefin copolymer excellent in balance between mechanical strength and processability.

2. Description of Prior Art

Ethylene polymers are molded into a film, sheet, bottle and the like by various molding methods such as inflation molding, T-die cast molding, blow molding, injection molding and the like, and used in various applications. Such ethylene polymers are required to have excellent processabilities such as small motor load in melt extrusion by an extruder, stability of bubble in inflation molding, no drooping down of a parison in blow molding, and the like. There are suggested, for example, a polymer obtained by polymerization of ethylene using a polymerization catalyst composed of silica supporting methylalumoxane, a specific metallocene complex and triisobutylaluminum, a polymer obtained by polymerization of ethylene using a polymerization catalyst composed of a specific metallocene complex, silica supporting methylalumoxane and triisobutylaluminum (see, e.g., JP 8-59741A and 9-235312A), and the like. Further suggested are a polymer obtained by copolymerization of ethylene and α-olefin using a catalyst formed from racemic-ethylenebis(1-indenyl)zirconium diphenoxide, triusobutylaluminum and a co-catalyst carrier obtained by contacting diethylzinc with pentafluorophenol, then, contacting silica treated with hexamethyldisilazane, then, contacting water (see, e.g., JP2003-171412A); a polymer obtained by copolymerization of ethylene and α-olefin using a catalyst formed from racemic-ethylenebis,(1-indenyl)zirconium diphenoxide, triisobutylaluminum and a co-catalyst carrier obtained by contacting diethylzinc with silica treated with hexamethyldisilazane, then, contacting pentafluorophenol, then, contacting water (see, e.g., JP 2004-149760A and 2005-97481A), and the like.

However, the above-mentioned ethylene polymers are not sufficiently satisfactory in mechanical strength or processability in some cases.

SUMMARY OF THE INVENTION

Under such conditions, the present invention has an object of providing an ethylene polymer excellent in balance between mechanical strength and processability.

According to the present invention, an ethylene polymer excellent in balance between mechanical strength and processability can be provided.

That is, the present invention relates to an ethylene-α-olefin copolymer comprising a repeating unit derived from ethylene and a repeating unit derived from an α-olefin having 3 to 20 carbon atoms wherein a melt flow rate (MFR) is 0.01 to 100 g/10 minutes, a density is 860 to 970 kg/m³, a molecular weight distribution (Mw/Mn) is 2 to 8, and a ratio ($\eta^*_{0.1}/\eta^*_{100}$) of a dynamic complex viscosity ($\eta^*_{0.1}$) at a temperature of 190° C. and an angular frequency of 0.1 rad/s, to a dynamic complex viscosity ($\eta^*_{100}$) at a temperature of 190° C. and an angular frequency of 100 rad/s is 15 to 100.

DETAILED DESCRIPTION OF PREFERRED EXAMPLES

The ethylene-α-olefin copolymer of the present invention is a copolymer comprising repeating unit derived from ethylene and a repeating unit derived from an α-olefin having 3 to 20 carbon atoms. Examples of the α-olefin having 3 to 20 carbon atoms include propylene, 1-butene, 4-memthyl-1-pentene, 1-hexene, 1-octene, 1-decene and the like. More preferably listed are 1-butene and 1-hexene. The above-mentioned α-olefin having 3 to 20 carbon atoms may be used singly or in combination of two or more.

The content of the repeating unit derived from ethylene in the ethylene-α-olefin copolymer of the present invention is usually 50 wt % or more based on the total weight (100 wt %) of the ethylene-α-olefin copolymer. The content of the repeating unit derived from an α-olefin having 3 to 20 carbon atoms is usually 50 wt % or less based on the total weight (100 wt %) of the ethylene-α-olefin copolymer.

The ethylene-α-olefin copolymer of the present invention may have a repeating unit derived from a monomer other than ethylene and α-olefins having 3 to 20 carbon atoms, in a range not deteriorating the effect of the invention, in addition to the repeating units derived from ethylene and the repeating unit derived from an α-olefin having 3 to 20 carbon atoms, and this monomer includes conjugated dienes such as 1,3-butadiene, 2-methyl-1,3-butadiene and the like; non-conjugated dienes such as 1,4-pentadiene, 1,5-hexadiene and the like; unsaturated carboxylic acids such as acrylic acid, methacrylic acid and the like; unsaturated carboxylates such as methyl acrylate, ethyl acrylate, butyl acrylate, methyl methacrylate, ethyl methacrylate and the like; vinyl ester compounds such as vinyl acetate, and the like.

The ethylene-α-olefin copolymer of the present invention includes an ethylene-propylene copolymer, ethylene-1-butene copolymer, ethylene-1-hexene copolymer, ethylene-4-methyl-1-pentene copolymer, ethylene-1-octene copolymer, ethylene-1-butene-1-hexene copolymer, ethylene-1-butene-4-methyl-1-pentene copolymer, ethylene-1-butene-1-octene copolymer and the like. Preferable are an ethylene-1-butene copolymer, ethylene-1-hexene copolymer, ethylene-1-octene copolymer, ethylene-1-butene-1-hexene copolymer and ethylene-1-butene-1-octene copolymer, and more preferable is an ethylene-1-hexene copolymer.

The melt flow rate (MFR) of the ethylene-α-olefin copolymer of the present invention is 0.01 to 100 g/10 minutes. When MFR is too large, mechanical strength may be lower, and therefore, MFR is preferably 20 g/10 minutes or less, more preferably 5 g/10 minutes or less, further preferably 1 g/10 minutes or less. When MFR is too small, processability may be deteriorated, and therefore, MFR is preferably 0.05 g/10 minutes or more, more preferably 0.1 g/10 minutes or more. This MFR is measured by A method under conditions of a temperature of 190° C. and a load of 21.18 N according to JIS K 7210-1995.

The density of the ethylene-α-olefin copolymer of the present invention is 860 to 970 kg/m³. The density is preferably 960 kg/m³ or less for improving mechanical strength. For improving rigidity, the density is preferably 920 kg/m³ or more, more preferably 930 kg/m³ or more. The density is measured by A method defined in JIS K 7112-1980 using a sample subjected to annealing described in JIS K 6760-1995.

The molecular weight distribution (Mw/Mn) of the ethylene-α-olefin copolymer of the present invention is 2 to 8. When the molecular weight distribution is too large, mechanical strength may be deteriorated, and therefore, the molecular weight distribution is preferably 7 or less, more preferably 6 or less. When the molecular weight distribution is too small, processability may be deteriorated, and therefore, the molecular weight distribution is preferably 3 or more, more preferably 4 or more. The molecular weight distribution (Mw/Mn) is obtained by measuring the weight-average molecular weight (Mw) and number-average molecular weight (Mn) each in terms of polystyrene by gel permeation chromatography, and dividing Mw by Mn.

The ethylene-α-olefin copolymer of the present invention is a polymer having relatively narrow molecular weight distribution as described above, and is a polymer containing a molecule having a lot of long chain branches in small amount in high molecular weight components of the polymer. Since ethylene-α-olefin copolymer is such a copolymer containing a molecule having a lot of long chain branches in high molecular weight components, dynamic complex viscosity ($\eta^*_{0.1}$, unit: Pa·s) at a temperature of 190° C. and an angular frequency of 0.1 rad/s increases, and since the amount of the molecule having a lot of long chain branches is small, dynamic complex viscosity ($\eta^*_{100}$, unit: Pa·s) at a temperature of 190° C. and an angular frequency of 100 rad/s does not increase so much, therefore, the ratio ($\eta^*_{0.1}/\eta^*_{100}$) of dynamic complex viscosity ($\eta^*_{0.1}$) at a temperature of 190° C. and an angular frequency of 0.1 rad/s to dynamic complex viscosity ($\eta^*_{100}$) at a temperature of 190° C. and an angular frequency of 100 rad/s is larger as compared with that of conventionally known ethylene-α-olefin copolymers having relatively narrow molecular weight distribution. The ratio $\eta^*_{0.1}/\eta^*_{100}$ of the conventionally known ethylene-α-olefin copolymer having relatively narrow molecular weight distribution is smaller than 15, and such a copolymer may have poor processability.

The ratio $\eta^*_{0.1}/\eta^*_{100}$ of the ethylene-α-olefin copolymer of the present invention is 15 to 100. The ratio $\eta^*_{0.1}/\eta^*_{100}$ is preferably 16 or more, more preferably 18 or more, for enhancing processability. It is preferably 80 or less, more preferably 60 or less, for enhancing mechanical strength. The ratio $\eta^*_{0.1}/\eta^*_{100}$ is measured using a viscoelasticity measuring apparatus (for example, Rheometrics Mechanical Spectrometer RMS-800 manufactured by Rheometrics, and the like).

As the method of producing an ethylene-α-olefin copolymer of the present invention, there is, for example, a method in which ethylene and an α-olefin are copolymerized in the presence of a polymerization catalyst containing, as a catalyst component, a co-catalyst carrier (hereinafter, referred to as component (A)) in the form of solid particle obtained by allowing a co-catalyst component such as an organoaluminum compound, organoaluminum oxy compound, boron compound, organozinc compound and the like to be carried on a carrier in the form of particle, a metallocene complex (hereinafter, referred to as component (B)) having a structure containing two ligands having a cyclopentadienyl skeleton and in which the two ligands are connected via a bridging group such as an alkylene group, silylene group and the like, and an organoaluminum compound (hereinafter, referred to as component (C)).

The co-catalyst carrier in the form of solid particle as the above-mentioned component (A) includes carries obtained by contacting a component (a): diethylzinc, a component (b): fluorinated phenol having 4 or less fluorine atoms, a component (c): water, a component (d): inorganic compound particle and a component (e): 1,1,1,3,3,3-hexamethyldisilazane (($CH_3$)$_3$Si)$_2$NH).

The fluorinated phenol having 4 or less fluorine atoms as the component (b) includes 3,4,5-trifluorophenol, 2,4,6-trifluorophenol, 3,5-difluorophenol and the like, and 3,4,5-trifluorophenol is most preferable. It is preferable to use fluorinated phenols having smaller number of fluorine atoms for decreasing the content of a molecular having a lot of long chain branches contained in higher molecular weight components or for narrowing the molecular weight distribution (Mw/Mn).

As the inorganic compound particle as the component (d), silica gel is preferable.

Regarding the use amounts of the above-mentioned component (a), component (b) and component (c), it is preferable that y and z satisfy the following formula when the molar ratio of the use amounts of the components is component (a): component (b):component (c)=1: y:z.

$$|2-y-2z|<1$$

In the above-mentioned formula, y is preferably 0.3 or more, more preferably 0.4 or more, further preferably 0.45 or more. Preferably, y is 0.55 or less. For increasing $\eta^*_{0.1}/\eta^*_{100}$, larger y is preferable, and for decreasing $\eta^*_{0.1}/\eta^*_{100}$, smaller y is preferable. For increasing molecular weight distribution (Mw/Mn), larger y is preferable, and for decreasing molecular weight distribution (Mw/Mn), smaller y is preferable.

Regarding the amount of the component (d) based on the component (a), the molar number of a zinc atom contained in particles obtained by contact of the component (a) and the component (d) is preferably 0.1 mmol or more, more preferably 0.5 to 20 mmol per g of the particle. Regarding the amount of the component (e) based on the component (d), the molar number of the component (e) is preferably 0.1 mmol or more, more preferably 0.5 to 20 mmol per g of the component (d).

The order for contacting the component (a), component (b), component (c), component (d) and component (e) includes the following orders.

<1> The component (d) and the component (e) are contacted, then, the component (a) is contacted, then, the component (b) is contacted, then, the component (c) is contacted.

<2> The component (d) and the component (e) are contacted, then, the component (b) is contacted, then, the component (a) is contacted, then, the component (c) is contacted.

The contact order <1> is preferable.

The contact treatment of the component (a), component (b), component (c), component (d) and component (e) is preferably performed under an inert gas atmosphere. The treatment temperature is usually −100 to 300° C., preferably −80 to 200° C. The treatment time is usually 1 minute to 200 hours, preferably 10 minutes to 100 hours.

In the contact treatment of the component (a), component (b), component (c), component (d) and component (e), it is preferable to use a solvent. As the solvent, those showing no reactivity with components to be contacted with the solvent or with the resultant product obtained by contacting them, are usually used. The solvent includes aliphatic hydrocarbon solvents such as butane, pentane, hexane, heptane, octane, 2,2,4-trimethylpentane, cyclohexane and the like; and aromatic hydrocarbon solvents such as benzene, toluene, xylene and the like, and preferable is toluene.

As the metal atom of the metallocene complex (B), IV group atoms in the periodic table are preferable, and more preferable are zirconium and hafnium. As the ligand having a cyclopentadienyl skeleton, an indenyl group, methylindenyl group, methylcyclopentadienyl group and dimethylcyclopentadienyl group are preferable, and the bridging group, an ethylene group, dimethylmethylene group and dimethylsilylene group are preferable. Further, as the remaining substituent coordinating a metal atom, a diphenoxyl group and dialkoxy group are preferable. As the metallocene complex, ethylenebis(1-indenyl)zirconium diphenoxide is preferably mentioned.

The organoaluminum compound (C) is preferably triisobutylaluminum or tri-n-octylaluminum The amount of the metallocene complex (B) is preferably $5 \times 10^{-6}$ to $5 \times 10^{-4}$ mol per g of the co-catalyst carrier (A). Regarding the used amount of the organoaluminum compound (C), the molar ratio (Al/M) of the molar number of a metal atom in the metallocene complex (B) to the molar number of an aluminum atom in the organoaluminum compound (C) is preferably 1 to 2000.

The polymerization method is preferably a continuous polymerization method containing formation of particles of an ethylene-α-olefin copolymer, and examples thereof include a continuous gas phase polymerization method, continuous slurry polymerization method and continuous bulk polymerization method, and preferable is a continuous gas phase polymerization method. As the gas phase polymerization reaction apparatus used in the polymerization, an apparatus having a fluidized bed type reaction vessel is usually used, and an apparatus having a fluidized bed type reaction vessel having an enlarged portion is preferably used. The reaction vessel may be equipped with a stirring blade.

As the method of feeding components of a polymerization catalyst used for production of an ethylene-α-olefin copolymer of the present invention into a reaction vessel, there are usually used a method of feeding in the absence of water using an inert gas such as nitrogen and argon, hydrogen, ethylene and the like, and a method in which components are dissolved or diluted in a solvent, and the components are fed in the form of solution or slurry. Components of a catalyst may be fed separately, or any components may be contacted in any order previously before feeding them.

In the process, pre-polymerization may be conducted, and pre-polymerization catalyst components previously polymerized may be used as catalyst components of a catalyst in the main polymerization.

The polymerization temperature is usually not higher than a temperature at which an ethylene-α-olefin copolymer melts, and preferably 0 to 150° C., more preferably 30 to 100° C. The polymerization temperature is preferably 60 to 100° C., more preferably 70 to 100° C., for decreasing the content of a molecular having a lot of long chain branches contained in higher molecule weight components or for narrowing the molecular weight distribution.

For the purpose of regulating the melt flowability of an ethylene-α-olefin copolymer, hydrogen may be added as a molecular weight controlling agent into a polymerization reaction vessel. Further, an inert gas may be added into a polymerization reaction vessel. It is preferable to lower the hydrogen concentration for increasing $\eta^*_{0.1}/\eta^*_{100}$, and it is preferable to increase the hydrogen concentration for decreasing $\eta^*_{0.1}/\eta^*_{100}$. It is preferable to lower the hydrogen concentration for narrowing the molecular weight distribution (Mw/Mn), and it is preferable to increase the hydrogen concentration for enlarging the molecular weight distribution (Mw/Mn).

The ethylene-α-olefin copolymer of the present invention may contain an additive, if necessary. Examples of the additive include antioxidants, weathering agents, lubricants, anti-blocking agents, antistatic agents, anti-fogging agents, anti-dropping agents, pigments, fillers and the like.

The ethylene-α-olefin copolymer of the present invention is molded into various molded bodies (film, sheep, bottle, tray and the like) by known molding processing methods, for example, extrusion molding methods such as an inflation film molding processing method, T die film molding processing method and the like, or a hollow molding method, cross-linking forming, injection molding method, compression molding method and the like, and as the molding processing method, an extrusion molding method, cross-linking forming and hollow molding method are suitably used.

The ethylene-α-olefin copolymer of the present invention is excellent in balance between mechanical strength and processability, and further excellent in rigidity. Thus, the copolymer is suitably used for extrusion molded bodies, particularly, films for wrapping foods, vessels for wrapping foods, surface protective films, and hollow molded bodies, particularly, cross-linking formed body blow bottles and squeeze bottles.

EXAMPLES

The present invention is illustrated by, the following examples and comparative examples.

In the examples and comparative examples, items were measured according to the following methods.

(1) Melt Flow Rate (MFR, unit: g/10 minutes)

It was measured by A method under conditions of a load of 21.18 N and a temperature of 190° C. according to a method defined in JIS K 7210-1995.

(2) Density (unit: kg/m$^3$)

It was measured according to a method defined in A method in JIS K 7112-1980. A sample was subjected to annealing described in JIS K 6760-1995.

(3) Molecular Weight Distribution (Mw/Mn)

The molecular weight distribution (Mw/Mn) was obtained by measuring the weight-average molecular weight (Mw) and number-average molecular weight (Mn) each in terms of polystyrene by gel permeation chromatography (GPC), and dividing Mw by Mn.

Apparatus: Waters 150C manufactured by Waters Corporation
Separation column: TOSOH TSKgel GMH-HT
Measuring temperature: 145° C.
Carrier: ortho-dichlorobenzene
Flow rate: 1.0 mL/minute
Injection amount: 500 μL (4) $\eta^*_{0.1}/\eta^*_{100}$ Dynamic complex viscosities were measured at angular frequencies from 0.1 rad/s to 100 rad/s under the following conditions using a viscoelasticity measuring apparatus, then, the dynamic complex viscosity ($\eta^*_{0.1}$) at an angular frequency of 0.1 rad/s was divided by the dynamic complex viscosity ($\eta^*_{100}$) at an angular frequency of 100 rad/s to give ($\eta^*_{0.1}/\eta^*_{100}$).

Apparatus: Rheometrics Mechanical Spectrometer RMS-800 manufactured by Rheometrics Inc.
Temperature: 190° C.
Geometry: parallel plate
Plate diameter: 25 mm
Plate interval: 1.5 to 2 mm
Strain: 5%
Angular frequency: 0.1 to 100 rad/s
Measuring atmosphere: nitrogen (5) Tensile Impact Strength (unit: kJ/m$^2$)

The tensile impact strength of a sheet having a thickness of 2 mm obtained by compression molding under conditions of a molding temperature of 190° C., an preheat time of 10 minutes, a compression time of 5 minutes and a compression pressure of 5 MPa was measure according to ASTM D1822-68. When this value is larger, mechanical strength is more excellent.

(6) Melt Tension (MT, unit: cN)

A melt resin filled in a barrel of 9.5 mmφ was extruded through an orifice having a diameter of 2.09 mmφ and a length of 8 mm under a temperature of 190° C. using melt tension tester manufactured by Toyo Seiki Seisakusho K.K. at a piston lowering speed of 5.5 mm/minute (shearing speed: 7.4 sec$^{-1}$), and the extruded melt resin was wound at a winding lifting speed of 40 rpm/minutes using a winding roll of 50 mmφ, and the tension value directly before breaking of the melt resin was measured. When this value is larger, the melt tension is larger, indicating more excellent processability.

(7) Melt Flow Rate Ratio (MFRR)

The melt flow rate value measured by A method under conditions of a load of 211.8N and a temperature of 190° C. according to a method defined in JIS K 7210-1995 was divided by a value measured by A method under conditions of a load of 21.18 N and a temperature of 190° C. to give MFRR. When this value is large, extrusion torque in molding processing is lower, indicating more excellent processability.

Example 1

(1) Treatment of Silica

Into a nitrogen-purged reaction vessel equipped with a stirrer was charged 500 ml of toluene as a solvent and 50.1 g of silica subjected to heat treatment at 300° C. under nitrogen flow (Sylopol 948 manufactured by Davison; average particle size=55 μm; pore volume=1.67 ml/g; specific surface area=325 m$^2$/g), and the mixture was stirred. Thereafter, the mixture was cooled to 5° C., then, a mixed solution of 28.5 ml of 1,1,1,3,3,3-hexamethyldisilazane and 38.3 ml of toluene was dropped over a period of 30 minutes while maintaining the temperature in the reaction vessel at 5° C. After completion of dropping, the mixture was stirred at 5° C. for 1 hour and at 95° C. for 3 hours, and filtrated. The resulting solid component was washed 6 times with 500 mol of toluene and twice with 500 ml of hexane. Thereafter, the solid component was dried at 23° C. for 1 hour under reduced pressure, to obtain 52.2 g of surface-treated silica gel.

(2) Preparation of Co-Catalyst Carrier

Into a 100 ml four-necked flask purged with nitrogen after drying under reduced pressure was charged with 5.38 g of the surface-treated silica gel obtained in Example 1 (1) and 37.5 ml of toluene. Next, 13.5 ml of hexane solution of diethylzinc having a diethylzinc concentration of 2 mmol/ml was added and the mixture was stirred. Thereafter, the mixture was cooled to 5° C., then, 5.56 ml of toluenesolution of 3,4,5-trifluorophenol having a 3,4,5-trifluorophenol concentration of 2.42 mmol/ml was dropped over a period of 60 minutes while keeping the temperature in the reaction vessel at 5° C. After completion of dropping, the mixture was stirred at 5° C. for 1 hour and at 40° C. for 1 hour. Thereafter, 0.36 ml of water was dropped over a period of 1.5 hours while keeping the temperature in the reaction vessel at 5° C. After completion of dropping, the mixture was stirred at 5° C. for 1.5 hours and at 40° C. for 2 hours, further at 80° C. for 2 hours. After stopping of stirring, the mixture was allowed to standstill, 30 ml of the supernatant was extracted, 30 ml of toluene was added, and the mixture was heated up to 95° C., the mixture was stirred for 4 hours, and after stirring, the supernatant was extracted, to obtain a solid component. The resultant solid component was washed 4 times with 30 ml of toluene and 3 times with 30 ml of hexane. Then, the mixture was dried to obtain a solid component (hereinafter, referred to as co-catalyst carrier (A)).

(3) Polymerization

A 5 L autoclave equipped with a stirrer, purged with argon after drying under reduced pressure was evacuated, and hydrogen was added so that its partial pressure was 0.003 MPa, and 10 ml of 1-hexene and 1195 g of butane were added, and the temperature in the system was raised up to 70° C., then, ethylene was introduced so that its partial pressure was 1.6 MPa, to stabilize an atmosphere in the system. As a result of gas chromatography, the gas composition in the system contained hydrogen=0.09 mol %. To this was added 1.5 mL of heptane solution of triisobutylaluminum having a triisobutylaluminum concentration of 1 mmol/mL. Next, 2.3 mL of toluene solution of racemic-ethylenebis(1-indenyl)zirconium diphenoxide having a racemic-ethylenebis(1-indenyl) zirconium diphenoxide concentration of 2 μmol/mL was added, subsequently, 36.5 mg of the co-catalyst carrier (A) obtained in Example 1 (2) was added. Polymerization was carried out at 70° C. for 60 minutes while continuously feeding an ethylene/hydrogen mixed gas (hydrogen=0.09 mol %) to maintain the total pressure and the hydrogen concentration in the gas constant during the polymerization. Thereafter, butane, ethylene and hydrogen were released, to obtain 128 g of an ethylene-1-hexene copolymer. The physical properties of the resultant ethylene-1-hexene copolymer are shown in Table 1.

Example 2

A 5 L autoclave equipped with a stirrer, purged with argon after drying under reduced pressure was evacuated, and hydrogen was added so that its partial pressure was 0.0007 MPa, and 20 ml of 1-hexene and 1189 g of butane were added, and the temperature in the system was raised up to 70° C., then, ethylene was introduced so that its partial pressure was 1.6 MPa, to stabilize an atmosphere in the system. As a result of gas chromatography, the gas composition in the system contained hydrogen=0.04 mol %. To this was added 4.5 mL of heptane solution of triisobutylaluminum having a triisobutylaluminum concentration of 1 mmol/mL. Next, 2.3 mL of toluene solution of racemic-ethylenebis(1-indenyl)zirconium diphenoxide having a racemic-ethylenebis(1-indenyl) zirconium diphenoxide concentration of 2 μmol/mL was added, subsequently, 25.4 mg of the co-catalyst carrier (A) obtained in Example 1 (2) was added. Polymerization was carried out at 70° C. for 60 minutes while continuously feeding an ethylene/hydrogen mixed gas (hydrogen=0.08 mol %) to maintain the total pressure and the hydrogen concentration in the gas constant during the polymerization. Thereafter, butane, ethylene and hydrogen were released, to obtain 152 g of an ethylene-1-hexene copolymer. The physical properties of the resultant ethylene-1-hexene copolymer are shown in Table 1.

Example 3

A 5 L autoclave equipped with a stirrer, purged with argon after drying under reduced pressure was evacuated, and hydrogen was added so that its partial pressure was 0.0001 MPa, and 20 ml of 1-hexene and 1186 g of butane were added, and the temperature in the system was raised up to 70° C., then, ethylene was introduced so that its partial pressure was 1.6 MPa, to stabilize an atmosphere in the system. As a result of gas chromatography, the gas composition in the system contained hydrogen=0.03 mol %. To this was added 4.5 mL of heptane solution of triisobutylaluminum having a triisobutylaluminum concentration of 1 mmol/mL. Next, 2.3 mL of toluene solution of racemic-ethylenebis(1-indenyl)zirconium diphenoxide having a racemic-ethylenebis(1-indenyl) zirconium diphenoxide concentration of 2 μmol/mL was added, subsequently, 25.8 mg of the co-catalyst carrier (A) obtained in Example 1 (2) was added. Polymerization was carried out at 70° C. for 70 minutes while continuously feeding an ethylene/hydrogen mixed gas (hydrogen=0.05 mol %)

to maintain the total pressure and the hydrogen concentration in the gas constant during the polymerization. Thereafter, butane, ethylene and hydrogen were released, to obtain 160 g of an ethylene-1-hexene copolymer. The physical properties of the resultant ethylene-1-hexene copolymer are shown in Table 1.

Example 4

A 5 L autoclave equipped with a stirrer, purged with argon after drying under reduced pressure was evacuated, and hydrogen was added so that its partial pressure was 0.004 MPa, and 10 ml of 1-hexene and 1194 g of butane were added, and the temperature in the system was raised up to 70° C., then, ethylene was introduced so that its partial pressure was 1.6 MPa, to stabilize an atmosphere in the system. As a result of gas chromatography, the gas composition in the system contained hydrogen =0.18 mol %. To this was added 1.5 mL of heptane solution of triisobutylaluminum having a triusobutylaluminum concentration of 1 mmol/mL. Next, 2.3 mL of toluene solution of racemic-ethylenebis(1-indenyl)zirconium diphenoxide having a racemic-ethylenebis(1-indenyl) zirconium diphenoxide concentration of 2 µmol/mL was added, subsequently, 28.6 mg of the co-catalyst carrier (A) obtained in Example 1 (2) was added. Polymerization was carried out at 70° C. for 60 minutes while continuously feeding an ethylene/hydrogen mixed gas (hydrogen=0.09 mol %) to maintain the total pressure and the hydrogen concentration in the gas constant during the polymerization. Thereafter, butane, ethylene and hydrogen were released, to obtain 106 g of an ethylene-1-hexene copolymer. The physical properties of the resultant ethylene-1-hexene copolymer are shown in Table 1.

Comparative Example 1

(1) Preparation of Co-Catalyst Carrier

A solid component (hereinafter, referred to as co-catalyst carrier (C)) was obtained in the same manner as for a component (A) of Example 53 (1) of International Publication 02/051878, pamphlet excepting that silica previously contacted with 1,1,1,3,3,3-hexamethyldisilaxane was used as silica.

(2) Polymerization

A 5 L autoclave equipped with a stirrer, purged with argon after drying under reduced pressure was evacuated, and hydrogen was added so that its partial pressure was 0.003 MPa, and 50 ml of 1-hexene and 1166 g of butane were added, and the temperature in the system was raised up to 70° C., then, ethylene was introduced so that its partial pressure was 1.6 MPa, to stabilize an atmosphere in the system. As a result of gas chromatography, the gas composition in the system contained hydrogen =0.88 mol %. To this was added 6.0 mL of heptane solution of triisobutylaluminum having a triisobutylaluminum concentration of 1 mmol/mL. Next, 3 mL of toluene solution of racemic-ethylenebis(1-indenyl)zirconium diphenoxide having a racemic-ethylenebis(1-indenyl) zirconium diphenoxide concentration of 2 µmol/mL was added, subsequently, 36.5 mg of the co-catalyst carrier (C) prepared in Comparative Example 2 (1) was added. Polymerization was carried out at 70° C. for 100 minutes while continuously feeding an ethylene/hydrogen mixed gas (hydrogen=0.96 mol %) to maintain the total pressure and the hydrogen concentration in the gas constant during the polymerization. Thereafter, butane, ethylene and hydrogen were released, to obtain 77 g of an ethylene-1-hexene copolymer. The physical properties of the resultant ethylene-1-hexene copolymer are shown in Table 1.

Comparative Example 2

The physical properties of a commercially available ethylene-based copolymer (Affinity HF1030, manufactured by the Dow Chemical Company) are shown in Table 1.

TABLE 1

| | Example 1 | Example 2 | Example 3 | Example 4 | Comparative Example 1 | Comparative Example 2 |
|---|---|---|---|---|---|---|
| Physical properties | | | | | | |
| MFR (g/10 minutes) | 0.20 | 0.21 | 0.02 | 1.0 | 0.28 | 2.2 |
| Density (Kg/m$^3$) | 947 | 941 | 937 | 952 | 949 | 936 |
| Mw/Mn (—) | 4.7 | 4.3 | 4.2 | 6.3 | 26.5 | 2.3 |
| $\eta^*_{0.1}/\eta^*_{100}$ (—) | 31.2 | 22.5 | 49.1 | 17.9 | 69.0 | 6.1 |
| Tensile impact strength (kJ/m$^2$) | 290 | 500 | 790 | 120 | 90 | 270 |
| Processability | | | | | | |
| MT (cN) | 16.3 | 17.3 | 25.0 | 8.6 | 4.9 | 1.2 |
| MFRR (—) | 122 | 66 | 134 | 66 | 340 | 31 |

What is claimed is:

1. An ethylene-α-olefin copolymer comprising a repeating unit derived from ethylene and a repeating unit derived from hexene, wherein said copolymer has a melt flow rate (MFR) of 0.1 to 5 g/10 minutes, a density of 920 to 960 kg/m$^3$, a molecular weight distribution (Mw/Mn) of 3 to 7, and a ratio ($\eta^*_{0.1}/\eta^*_{100}$) of a dynamic complex viscosity ($\eta^*_{0.1}$) at a temperature of 190° C. and an angular frequency of 0.1 rad/s, to a dynamic complex viscosity ($\eta^*_{100}$) at a temperature of 190° C. and an angular frequency of 100 rad/s of 15 to 60.

2. The ethylene-α-olefin copolymer according to claim 1, wherein the molecular weight distribution is 6 or less.

3. The ethylene-α-olefin copolymer according to claim 1, wherein the molecular weight distribution is 4 or more.

4. The ethylene-α-olefin copolymer according to claim 1, wherein the ratio ($\eta^*_{0.1}/\eta^*_{100}$) is 16 or more.

5. The ethylene-α-olefin copolymer according to claim 1, wherein the ratio ($\eta^*_{0.1}/\eta^*_{100}$) is 18 or more.

* * * * *